Dec. 16, 1930.                    W. C. STATE                    1,785,659
                              TIRE BUILDING MACHINE
                              Filed Feb. 12, 1929
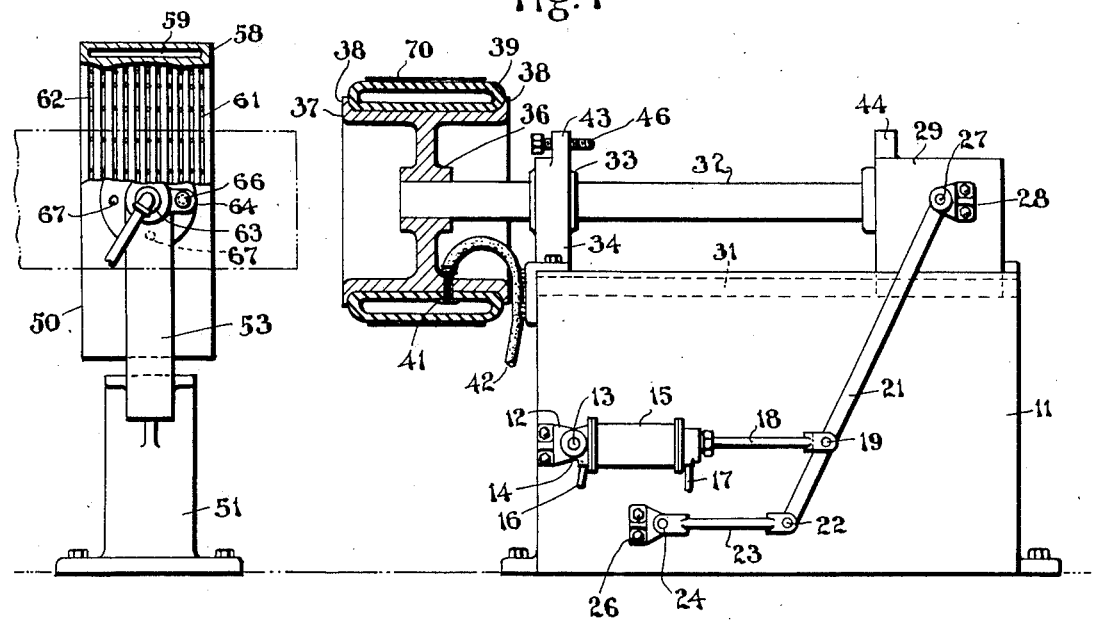
Inventor
Will C. State Patented Dec. 16, 1930

1,785,659

UNITED STATES PATENT OFFICE

REISSUED

WILL C. STATE, OF AKRON, OHIO, ASSIGNOR TO THE GOODYEAR TIRE & RUBBER COMPANY, OF AKRON, OHIO, A CORPORATION OF OHIO

TIRE-BUILDING MACHINE

Application filed February 12, 1929. Serial No. 339,371.

This invention relates to the manufacture of pneumatic tire casings for vehicles, and it has particular relation to a machine for and method of assembling the tread element and the various plies of fabric embodied in such casings.

One object of the invention is to provide a tire building machine in which the use of rollers for stitching the various plies of which the tire is composed, is obviated.

Another object of the invention is to provide a simple mechanism for transporting and correctly centering the various plies of which the tire carcasses are composed with respect to the carcass.

Heretofore, in the manufacture of pneumatic tires, it has been customary to employ some form of core, either of cylindrical or of toroidal contour, upon which the various plies of which the tire carcasses are composed were assembled. In manufacturing tires in accordance with this method, the various plies consisting of rubber or rubberized material were disposed loosely upon the form, and were then stitched together by pressing a small roller or disk against the surface of the ply while the form was being rotated. This method was relatively slow, because considerable time was consumed in the stitching operations. Also, since the form or core was of the same external diameter as the internal diameter of the tire carcass, it was relatively difficult to slip endless bands of fabric, such as frequently used in the construction of tires, over the form.

In a machine constructed in accordance with this invention, the plies or bands are disposed individually or in groups upon a deflated pneumatic tube which is secured upon a cylinder or drum. The drum supporting one or more plies is then trust forward by means of suitable mechanism into a ring of hollow construction, where the pneumatic tube is inflated to press all portions of the plies against the inner surface of the ring. A vacuum or partial vacuum is then created by convenient means between the inner surface of the ring and outer surface of the ply, thus effectually securing the ply or plies in such position as to permit deflection of the tube, retraction of the drum and application of the remaining plies.

For a better understanding of the invention, reference may now be had to the accompanying drawings, forming a part of the specification, of which:

Figure 1 is a view, partially in cross-section and partially in elevation, of one embodiment of the invention; and Figure 2 is an elevational view of the vacuum ring employed to receive and support the various plies of which the tires are composed.

In practicing the invention, a transfer device comprising a base 11 is provided upon one side thereof with a bracket 12, having a pintle 13 projecting therefrom. The latter element functions as a pivot for a bracket or lug 14 upon the rear end of a cylinder 15. Opposite ends of the latter are connected to suitable sources of compressed fluid, such as air or steam, by means of conduits 16 and 17.

From the forward end of the cylinder projects a piston rod 18, which is pivotally attached at 19 to a lever 21. The lower end of the lever, in turn, is pivoted at 22 to the forward end of a link 23, which is hinged, as indicated at 24, to a bracket 26 secured to the side of the base 11. The upper end of the lever 21 is pivoted by means of a pin 27 to a bracket 28, rigidly mounted upon the side of a sliding block 29, that reciprocates in guideways 31 formed in the upper surface of the base 11.

A horizontal shaft 32 is secured to the forward face of the sliding block 29, and projects forwardly through a supporting bearing 33 formed in an upstanding bracket 34 attached to the forward face of the base 11. The forward extremity of the shaft is keyed within a hub portion 36 of a drum 37 having marginal flange portions 38, which serve to confine an endless pneumatic tube 39. In order to inflate the tube, a valve 41 is inserted in openings formed in the inner periphery thereof and in the drum 37, and is connected at its outer end to a flexible conduit 42 which is attached to a suitable source of supply (not shown) of compressed fluid.

In order adjustably to limit the extent of travel of the block 29 and the drum 37, upstanding lugs 43 and 44 are provided respectively upon the upper extremities of the bracket 34 and the block 29. One of these elements, for example lug 43, is bored and threaded to receive an adjustable stop screw 46 disposed in the path of movement of the lug 44.

A device 50 for supporting the tire carcasses during the process of assembly is disposed in alignment with the transfer drum 37. This device comprises a base or stand 51 having horizontally extending arms 52 to the ends of which upstanding brackets 53 are attached. The upper portions of these brackets are provided with bearings 54, within which are journalled trunnions 56 and 57 of a ring or annular supporting device 58. As best shown in Figure 1, this device is formed with a circumferentially extending chamber 59, which communicates, by means of a series of small openings 61, formed at regular spaced intervals in the inner wall of the annular member, with a series of peripherally extending grooves 62 formed in the inner surface of said member. The chamber 59 is connected to suitable means (not shown) for creating a vacuum by means of a conduit 63 which communicates with the chamber through the hollow trunnion 57.

In order to alter the position of the ring 58, the bracket 53 is formed with a laterally projecting lug 64, which is bored to receive a spring actuated latch bolt 66, that may be projected into engagement with any one of a series of radially arranged openings 67, formed in a boss-like portion upon the ring 59 adjacent the trunnion 57.

In the operation of this apparatus, a tread ply 70 of a tire is first disposed about the pneumatic tube 39. If desired, the ply may be formed into an annulus, and then slipped endwise over the drum 37, or it may be taken as a strip or band and wound about the drum. After the application of the tread ply, compressed fluid is admitted into the cylinder 15 to actuate the piston 18, thereby causing forward movement of the block 29 and the drum 37 until the tread ply is correctly centered within the ring 58.

Compressed fluid is then admitted through the conduit 42 to the pneumatic tube or annulus 39, thereby expanding the latter member and causing the outer circumference of the tread ply to be pressed against the inner walls of the annulus 58. Upon the application of vacuum to the chamber 59, the ply is caused to adhere to the inner circumference of the ring. The tube 39 is then so deflated that the drum 37 may be retracted from the annulus, leaving the tread ply securely held within the annulus by the pressure created by the vacuum.

The breaker strips and various plies of fabric may then be disposed in turn upon the outer circumference of the tube 39, and transported to position within the inner circumference of the tread band. Application of pressure within the tube 39 causes the outer periphery of each ply to be pressed against the inner surface of the preceding ply to which it then adheres, due to the relatively tacky character of the unvulcanized rubber of which the plies are formed or with which they are treated. It will be apparent that the application of pressure within the relatively flexible tube or annulus 39 will cause the bag to expand and press substantially uniformly against all portions of the ply which encircles it. In this way, adhesion is obtained between the various plies without the necessity of applying a stitcher roller thereto.

Since the bead rings of pneumatic tires are relatively narrow and inflexible, it is desirable to place these elements in position by manual operation rather than by mechanical means. This labor is greatly facilitated by releasing the latch bolt 66 and rotating the annulus 58 to the horizontal position indicated in broken lines in Figure 1. The annulus is held in this position by disposing the latch bolt 66 into the proper opening 67. The operation of turning the edge portions of the plies in about the beads is also accomplished by means of a convenient manually operated tool, while the ring 58 is in a horizontal position. After a tire band has been completed, the vacuum in the chamber 59 is released, thus permitting the band to be removed from the forming ring.

The tread portions of pneumatic tire bands thus assembled may be expanded to the toroidal form requisite in pneumatic tires, by placing them upon any convenient shaping device. Also, vulcanization of the bands is performed in the usual manner.

From the foregoing description, it will be apparent that an extremely simple device has been provided for the assembly of pneumatic tires, by employment of which the use of stitcher rollers is obviated. Furthermore, since the tube 39 may be deflated practically to any desired extent, it is a relatively easy task so to reduce its size as to permit the various plies of material to be accurately centered thereon. By adjustment of the screw 46 it is possible so to limit the motion of the block 29 that the plies are then accurately centered with respect to the inner circumference of the ring 58 before the tube 39 is expanded to press the plies into position.

Although I have illustrated only one form which the invention may assume, and have described in detail only a single application thereof, it will be apparent to those skilled in the art that the invention is not so limited but that various modifications may be made therein without departing from the spirit of the invention or from the scope of the appended claims.

What I claim is:

1. A method of constructing pneumatic tires which comprises supporting the outer plies of which the tires are composed by their outer surfaces, and then successively applying the various inner plies to the inner face of the outer ply the order of the plies with respect to the central axis of the tire being the same during the construction as in the finished tire.

2. A method of constructing pneumatic tires which comprises supporting the outer plies of which the tires are composed by their outer surfaces, successively applying the various inner plies to the inner face of the outer ply, and securing the successive plies into position by the application of radially outwardly directed force.

3. A machine for constructing pneumatic tire casings comprising means for supporting the tread ply of a pneumatic tire casing by its outer periphery, means successively to insert the inner plies within the inner circumference of the tread ply, and means to secure each successive ply into position against the inner circumference of the preceding ply.

4. A machine for constructing pneumatic tire casings comprising means for supporting the tread ply of a pneumatic tire casing by its outer periphery, mechanism successively to insert the inner plies within the inner circumference of the tread ply, said mechanism including a pneumatic annulus adapted to be inserted within the tire carcass to secure each successive ply into position against the inner circumference of the preceding ply.

5. A machine for constructing pneumatic tire bands comprising a ring for receiving and supporting the bands, means for creating a vacuum between the inner surface of the ring and the band, and means for inserting and expanding plies of material within the ring.

6. A machine for constructing pneumatic tire bands comprising a ring for receiving and supporting the bands, vacuum means for drawing and supporting the outer surface of the band against the inner surface of the ring, and an axially movable pneumatic tube connected with a source of compressed fluid for inserting and expanding plies of material within the ring.

7. A machine for constructing pneumatic tires comprising a circumferentially chambered annular ring having openings extending through the inner walls of the ring and communicating with the chambered portion thereof, means for creating a vacuum within the chambered ring, and means for inserting and expanding plies of tire material within the inner circumference of the ring.

8. A machine for constructing pneumatic tires comprising a circumferentially chambered annular ring having openings extending through the inner walls of the ring and communicating with the chambered portion thereof, means for creating a vacuum within the chambered ring, and means including an axially movable pneumatic tube for inserting and expanding plies of tire material within the inner circumference of the ring.

9. A machine for constructing pneumatic tires comprising a support, a hollow ring having openings formed in its inner wall communicating with the hollow portion thereof, means for journaling the ring upon the support for movement about a horizontal axis perpendicular to the axis of the ring, means for creating a vacuum in the hollow ring, and means for inserting and expanding plies of tire material within the ring.

10. A machine for constructing pneumatic tires comprising a support, a ring having an annular chamber therein, means for journaling the ring upon the support for movement about a horizontal axis perpendicular to the axis of the ring, said ring having openings formed in the inner wall thereof and communicating with said chamber, means for creating a vacuum in the chamber, and means including an axially movable, expandable pneumatic tube for inserting and expanding plies of tire material within the ring.

11. A method of constructing pneumatic tires which comprises supporting the outer plies of which the tires are composed by their outer surfaces, and then applying the various inner plies to the inner periphery of the outer ply, the order of the plies with respect to the central axis of the tire being the same during the construction as in the finished tire.

12. A method of constructing pneumatic tires which comprises supporting the outer plies of which the tires are composed by their outer surfaces, applying the inner plies to the inner periphery of the outer plies and securing the plies into position by the application of radially outwardly directed force.

In witness whereof, I have hereunto signed my name at Akron, in the county of Summit and State of Ohio, U. S. A., this 11th day of February, 1929.

WILL C. STATE.